United States Patent
Lakrout et al.

(10) Patent No.: US 11,198,753 B2
(45) Date of Patent: Dec. 14, 2021

(54) SURFACTANT-FREE FILLED POLYURETHANE FOAM AND METHOD OF MAKING SAME

(71) Applicant: BORAL IP HOLDINGS (AUSTRALIA) PTY LIMITED, North Sydney (AU)

(72) Inventors: Hamed Lakrout, San Antonio, TX (US); Russ Majors, San Marcos, TX (US); Brian Shaw, Elmendorf, TX (US); Guy Crocco, New Braunfels, TX (US); Li Al, San Antonio, TX (US); Amitabha Kumar, San Antonio, TX (US); Russell Hill, San Antonio, TX (US)

(73) Assignee: Westlake Royal Building Products Inc., Houston, TX (US)

( * ) Notice: Subject to any disclaimer, the term of this patent is extended or adjusted under 35 U.S.C. 154(b) by 301 days.

(21) Appl. No.: 16/302,450

(22) PCT Filed: May 23, 2016

(86) PCT No.: PCT/US2016/033756
§ 371 (c)(1),
(2) Date: Nov. 16, 2018

(87) PCT Pub. No.: WO2017/204781
PCT Pub. Date: Nov. 30, 2017

(65) Prior Publication Data
US 2020/0317851 A1    Oct. 8, 2020

(51) Int. Cl.
| | |
|---|---|
| C08G 18/42 | (2006.01) |
| C08G 18/76 | (2006.01) |
| C08J 5/04 | (2006.01) |
| C08J 9/00 | (2006.01) |
| C08K 7/02 | (2006.01) |
| C08K 7/14 | (2006.01) |
| C08K 11/00 | (2006.01) |

(52) U.S. Cl.
CPC ......... *C08G 18/42* (2013.01); *C08G 18/7671* (2013.01); *C08J 5/043* (2013.01); *C08J 5/046* (2013.01); *C08J 9/0066* (2013.01); *C08J 9/0085* (2013.01); *C08J 9/0095* (2013.01); *C08K 7/02* (2013.01); *C08K 7/14* (2013.01); *C08K 11/00* (2013.01); *C08G 2110/0066* (2021.01); *C08G 2110/0083* (2021.01); *C08J 2375/06* (2013.01); *C08K 2201/005* (2013.01)

(58) Field of Classification Search
CPC ............... C08G 18/42; C08G 18/7671; C08G 2101/0066; C08G 2101/0083; C08J 5/043; C08J 5/046; C08J 9/0066; C08J 9/0085; C08J 9/0095; C08J 2375/06; C08K 7/02; C08K 7/14; C08K 11/00; C08K 2201/005
See application file for complete search history.

(56) References Cited

U.S. PATENT DOCUMENTS

| | | | |
|---|---|---|---|
| 3,467,606 A | 9/1969 | Rice et al. | |
| 4,005,035 A | 1/1977 | Deaver | |
| 4,062,999 A | 12/1977 | Kondo et al. | |
| 5,064,876 A | 11/1991 | Hamada et al. | |
| 5,082,738 A | 1/1992 | Swofford | |
| 6,136,870 A | 10/2000 | Triolo et al. | |
| 6,211,259 B1* | 4/2001 | Borden | C08G 18/6677 521/106 |
| 6,602,379 B2 | 8/2003 | Li et al. | |
| 6,602,927 B1 | 8/2003 | Rothacker | |
| 9,932,457 B2* | 4/2018 | Hill | C08G 18/1808 |
| 10,324,978 B2* | 6/2019 | Hill | G06F 16/951 |
| 2007/0027227 A1* | 2/2007 | Shutov | C08G 18/4804 521/172 |
| 2011/0086931 A1* | 4/2011 | Herrington | C04B 26/16 521/83 |
| 2012/0029145 A1* | 2/2012 | Brown | C08G 18/0895 524/590 |

FOREIGN PATENT DOCUMENTS

WO   WO 2008/045342 A2   4/2008

OTHER PUBLICATIONS

International Search Report in PCT/US2016/033756, dated Jan. 17, 2017 (4 pages).

* cited by examiner

*Primary Examiner* — John M Cooney
(74) *Attorney, Agent, or Firm* — Bookoff McAndrews, PLLC

(57) ABSTRACT

Polyurethane foams and methods of manufacturing are described herein. The foam can include (a) a polyurethane formed by the reaction of (i) one or more isocyanates selected from the group consisting of diisocyanates, polyisocyanates, and mixtures thereof, and (ii) one or more polyols; and (b) a filler. The amount of filler in the foam can be from 50 to 90% by weight, based on the total weight of the foam. The filler can include a plurality of fibers and/or a particulate filler. The polyurethane foams described herein are made without adding a surfactant to the reaction mixture. The density of the polyurethane foam can be at least 5 lb/ft$^3$.

15 Claims, 1 Drawing Sheet

SURFACTANT-FREE FILLED POLYURETHANE FOAM AND METHOD OF MAKING SAME

This application is a U.S. National Stage filing under 35 U.S.C. § 371 of International Application No. PCT/US2016/033756, filed on May 23, 2016.

FIELD OF THE DISCLOSURE

This disclosure relates generally to polyurethane foams, more particularly, to surfactant-free highly filled polyurethane foams.

BACKGROUND OF THE DISCLOSURE

Polymeric composites that contain organic and/or inorganic filler materials have become desirable for a variety of uses because of their excellent mechanical properties and weathering stability. In general, the superior properties of the organic-inorganic composites are achieved through use of the organic as a matrix material that acts as a glue with enhanced flexural properties or as a fibrous component providing reinforcement and improved tensile properties. The inorganic material imparts various properties of rigidity, toughness, hardness, optical appearance, interaction with electromagnetic radiation, density, and many other physical and chemical attributes.

The use of polyurethane compositions has grown due to their superior tensile strength, impact resistance, and abrasion resistance compared to, for example, unsaturated polyester and vinyl ester-based composites. Processes for preparing polyurethane foamed compositions are known and have significant commercial success. In particular, it is known in the art to produce polyurethane foams by reacting a polyisocyanate with a polyol in the presence of a blowing agent, a catalyst, a surfactant, and optionally other ingredients. Although these formulations can produce suitable polyurethane foams, there is a need for alternate formulations for forming polyurethane foams. The compositions and methods described herein address these and other needs.

SUMMARY OF THE DISCLOSURE

Polyurethane foam and methods of manufacturing are described herein. In some embodiments, the foam can include (a) a polyurethane formed by the reaction of (i) one or more isocyanates selected from the group consisting of diisocyanates, polyisocyanates, and mixtures thereof, and (ii) one or more polyols; and (b) a filler in an amount of from greater than 50% to 90% by weight, based on the total weight of the polyurethane composite. The polyurethane foams described herein are made without adding a surfactant during the reaction of the one or more isocyanates and the one or more polyols. The density of the polyurethane foam can be at least 5 lb/ft$^3$. In some cases, the density of the foam can be from 10 lb/ft$^3$ to 35 lb/ft$^3$, from 10 lb/ft$^3$ to 30 lb/ft$^3$ or from 15 lb/ft$^3$ to 25 lb/ft$^3$.

The amount of polyurethane in the foam can be from 10% to 50% by weight, for example, 15% to 45% by weight, based on the total weight of the foam. In some embodiments, the one or more polyols can have an average hydroxyl number of from 100 to 700 mg KOH/g, from 100 to 500 mg KOH/g, or from 200 to 400 mg KOH/g. The one or more polyols can have an average molecular weight of from 250 to 1500 g/mol or from 500 to 1000 g/mol. The average functionality of the one or more polyols can be from 2.5 to 5.5, from 3 to 5.5, or from 3 to 4. In some embodiments, the average functionality of the one or more first polyols can be 2 or more. The one or more first polyols can have an average viscosity of 150 to 5000 cPs or from 150 to 2500 cPs at 25° C. In some cases, a blend of the one or more polyols and the one or more isocyanates used in the foams can have an average viscosity of from 100 to 6000 cPs, from 100 to 2500 cPs, or from 100 to 1400 cPs at 25° C.

As described above, the polyurethane foam can include a filler. The filler can have an average aspect ratio of length to diameter of from 1:1 to 10,000:1 or from 1:1 to 6000:1. The filler can include a particulate filler and/or a plurality of fibers. The particulate filler in the foam can include coal ash such as fly ash. In certain embodiments, the particulate filler can have a median particle size of less than 50 microns or less than 25 microns. In some embodiments, the particulate filler has a particle size distribution having at least two modes. The amount of particulate filler in the foam can be from 50 to 85% by weight, based on the total weight of the foam. For example, the particulate filler can be present in an amount from 50% to 80% or from 60% to 85% by weight, based on the total weight of the foam.

The plurality of fibers can be present in the foam can be from 0.25% to 10% by weight, based on the total weight of the foam. In some examples, the fibers can be present in an amount from 0.25% to 8%, from 0.25% to 6%, from 0.5% to 6%, or from 0.5% to 5% by weight, based on the total weight of the foam. The fibers can have an average aspect ratio of length to diameter of from 8:1 to 700:1. Examples of fibers useful in the foam can include a plurality of glass fibers, polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof. In some embodiments, the foam comprises a plurality of glass fibers. The glass fibers can have an average length of 1 mm or greater. In some examples, the glass fibers can have an average length of from 1.5 mm to 30 mm. In some examples, the glass fibers can have an average diameter of from 5 to 50 microns.

Methods of making the polyurethane foam are also described herein. The method can include mixing the (i) one or more isocyanates selected from the group consisting of diisocyanates, polyisocyanates, and mixtures thereof, (ii) one or more polyols, and (iii) filler to form a mixture. The mixture may further comprise a catalyst. The method can include applying shear to the mixture to disperse the filler in the mixture.

The polyurethane foam can be formed in a mold. The method can include applying the mixture to a mold at a viscosity of from 5,000 to 100,000 cPs or from 20,000 to 100,000 cPs at the temperature of the mixture. The mixture applied to the mold can have a tack free time of from 90 seconds to 7 minutes or from 2 to 7 minutes. The mixture can also have a cream time of from 20 to 120 seconds, from 40 to 120 seconds or from 80 to 120 seconds.

The method of making the polyurethane foam can include allowing the mixture to react and expand. The mixture can be expanded via a gas phase provided in situ by the reaction process or physically introduced into the mixture. As discussed herein, the filler (e.g., the particulate filler and/or fibers) may be used to control the distribution characteristics and bubble size of the gas phase in the polyurethane mixture. The gas phase can be captured after gelation of the foam. The mixture can be allowed to rise freely during foaming in the mold. In some embodiments, the foam does not reach a hardness of 20 shore D in less than 5 minutes or in less than 10 minutes.

DETAILED DESCRIPTION

Figure 1:
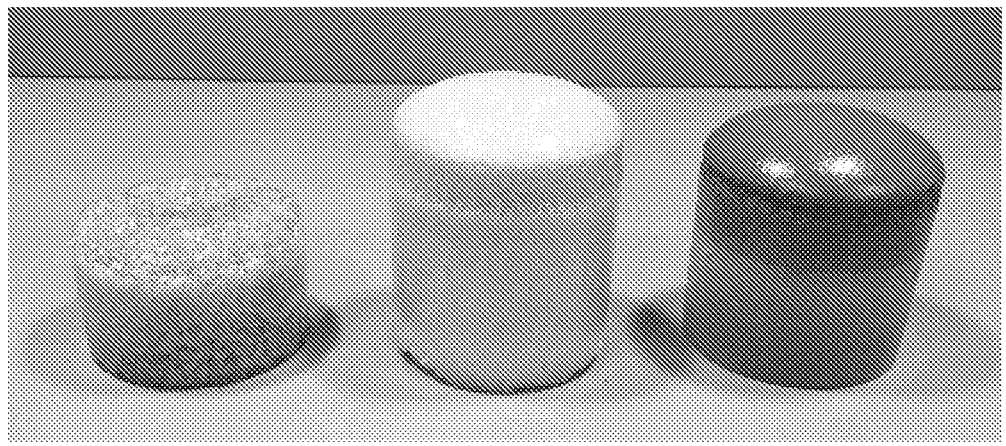
FIG. 1 is a photograph showing the height of polyurethane foams (foam samples 1, 2 and 3, respectively) formed with and without surfactant.

Polyurethane foams and methods of preparing the foam are described herein. As described herein, the polyurethane foam is made without adding a surfactant to the reaction mixture.

Surfactants have traditionally been used in polyurethane foams to perform several functions. Specifically, surfactants lower surface tension, emulsify incompatible formulation ingredients, promote nucleation of bubbles during mixing, stabilize the rising foam by reducing stress concentrations in thinning cell-walls, and counteract the defoaming effect of any solids added to or formed. By doing this, the surfactant prevents the coalescence of rapidly growing cells until those cells have attained sufficient strength through polymerization to become self-supporting. Without this effect, continuing cell coalescence would lead to total foam collapse or a cell structure with large cell size and an uncontrollable distribution.

In prior art formulations, the uniform and coherent distribution of bubbles throughout the matrix is possible by the addition of surfactants that control the bubble size and distribution by controlling the interfacial energy and surface tension of the gas phase and the rapidly hardening fluid phase of the polyurethane. The polyurethane foams described herein are made without a surfactant. Without wishing to be bound by theory, it is believed that the particulate filler and/or fibers can control the microstructure of the polyurethane foams provided in the present disclosure in the absence of a surfactant. In particular, the polyurethane foams described herein form a gel when the one or more polyols react with the one or more isocyanates during polymerization. The polymerization and gelation process may result in an increase in viscosity (when measured in centipoise) of at least five or more orders of magnitude, through a rapid process lasting several seconds to a few minutes. When a blowing agent, for example carbon dioxide produced in-situ or a physical blowing agent such as pentafluorocarbon-propane, is present in a suitable amount, there can be simultaneous production of fine to coarse bubbles of the gas phase dispersed in the rapidly gelling polyurethane matrix. The addition of one or more catalysts can further control the rate of the gelation and the rate of the blowing reaction. It is believed that the bubble size and the bubble distribution in the polyurethane can be controlled through the control of the viscosity change during the gelation reaction, the presence of particulate fillers, and/or fiber phases. In particular, the presence of particulate fillers and/or fibers in the gelling polyurethane can result in a higher starting viscosity of the mixture compared to polyurethane made without particulate fillers and/or fibers. The higher starting viscosity of the filled polyurethane mixture may allow for a preferred capture of the gas phase during the gelation process. The particulate and/or fibers present in the rapidly hardening polyurethane mixture may disrupt the gas phase and can prevent their coalescence into large bubbles. A uniform distribution of the particulate filler and/or fibers through external shear can permit a uniform distribution of the gas phase. Additionally, the filled polyurethane matrix can restrict migration of the bubbles which allows for a uniform distribution of the bubbles without the need for a surfactant. It is also believed that the size of the bubbles can be controlled by the dimensions (including diameter and length) of the particulate filler and/or fibers.

In accordance with the present disclosure, the polyurethane foam can comprise a polyurethane formed using reactive systems including isocyanates and polyols. Isocyanates suitable for use in the foam described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. The particular isocyanate used in the foam can be selected based on the desired viscosity of the mixture used to form the foam. An initial low viscosity is desirable for ease of handling. Other factors that influence the particular isocyanate can include the overall properties of the foam, such as the amount of foaming, strength of bonding to the filler, wetting of the inorganic particulates in the reaction mixture, strength of the resulting foam, stiffness (elastic modulus), and reactivity. Suitable isocyanate compositions for forming the foam include those having viscosities ranging from 25 to 700 cPs at 25° C.

An example of a useful diisocyanate is methylene diphenyl diisocyanate (MDI). Useful MDI's include MDI monomers, MDI oligomers, and mixtures thereof. Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* 2nd Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the foams described herein can be from 1.5 to 5. Further, examples of useful isocyanates include isocyanates with an average functionality of 2 to 4.5, 2.2 to 4, 2.4 to 3.7, 2.6 to 3.4, and 2.8 to 3.2.

As indicated herein, the polyurethane foam includes one or more polyols. It is generally desirable to use polyols in liquid form, and generally in low viscosity liquid form available, as these can be more easily mixed. Suitable polyol compositions for forming the polyurethane foam include those having viscosities of 5000 cPs or less at 25° C. In certain embodiments, the polyol composition can include those having viscosities of 4500 cPs or less, 4000 cPs or less, 3500 cPs or less, 3000 cPs or less, 2500 cPs or less, or 2000 cPs or less at 25° C. In certain embodiments, the polyol composition can include those having viscosities of 150 cPs or greater, 250 cPs or greater, 500 cPs or greater, 750 cPs or greater, 1000 cPs or greater, or 1500 cPs or greater. In certain embodiments, the polyol composition can include those having viscosities of from 150 to 5000 cPs or from 150 to 2500 cPs at 25° C. In some embodiments, a blend of the one or more polyols and the one or more isocyanates used in the foams can have a viscosity of from 100 to 6000 cPs, from 100 to 2500 cPs, from 100 to 1400 cPs, from 100 to 1200 cPs or from 100 to 1000 cPs at 25° C.

The one or more polyols for use in the polyurethane can include polyester polyols, polyether polyols, Mannich polyols, or combinations thereof. The choice and amounts of polyol, especially the number of reactive hydroxyl groups per polyol, the functionality, and the size and flexibility of its molecular structure, may control the mechanical and physical properties of the foam formed.

The one or more polyols can have an average equivalent weight of 150 g/eq or greater (e.g., 175 g/eq or greater, 200 g/eq or greater, 210 g/eq or greater, 220 g/eq or greater, 225 g/eq or greater, or 230 g/eq or greater). In some cases, the one or more polyols have an average equivalent weight of 700 g/eq or less (e.g., 550 g/eq or less, 500 g/eq or less, 450 g/eq or less, 400 g/eq or less, 350 g/eq or less, 300 g/eq or less, 275 g/eq or less, 250 g/eq or less, or 235 g/eq or less). In some cases, the one or more polyols have an average equivalent weight of from 150 g/eq to 700 g/eq, from 175 g/eq to 700 g/eq, from 150 g/eq to 500 g/eq, from 150 g/eq to 400 g/eq, or from 150 g/eq to 300 g/eq. In some embodiments, the one or more polyols do not include any polyols having an equivalent weight of 750 g/eq or greater.

In some embodiments, the one or more polyols in the polyurethane foam can include a less reactive polyol. The less reactive polyol can have lower numbers of primary hydroxyl groups, lower primary hydroxyl numbers, higher numbers of secondary hydroxyl groups, and higher cream times and tack-free times in a polyurethane mixture, than a highly reactive polyol. In some embodiments, the one or more polyols can be capped with an alkylene oxide group, such as ethylene oxide, propylene oxide, butylene oxide, and combinations thereof, to provide the polyols with the desired reactivity. In some examples, the one or more polyols can include a poly(propylene oxide) polyol which contain terminal secondary hydroxyl groups and are end-capped with ethylene oxide to provide polyols with primary hydroxyl groups.

In some embodiments, the one or more polyols have about 40% or less primary hydroxyl groups, about 35% or less primary hydroxyl groups, about 30% or less primary hydroxyl groups, about 25% or less primary hydroxyl groups, about 20% or less primary hydroxyl groups, about 15% or less primary hydroxyl groups, or even about 10% or less primary hydroxyl groups. The one or more polyols can have primary hydroxyl numbers (as measured in units of mg KOH/g) of less than about 220, less than about 200, less than about 180, less than about 160, less than about 140, less than about 120, less than about 100, less than about 80, less than about 60, less than about 40, or even less than about 20. The number of primary hydroxyl groups can be determined using fluorine NMR spectroscopy as described in ASTM D4273.

The one or more polyols can have hydroxyl numbers (as measured in units of mg KOH/g) of 1000 or less, 900 or less, 800 or less, 700 or less, 650 or less, 600 or less, 550 or less, 500 or less, 450 or less, 400 or less, 350 or less, 300 or less, 250 or less, 200 or less, or 150 or less. The one or more polyols can have hydroxyl numbers (as measured in units of mg KOH/g) of 50 or more, 100 or more, 150 or more, 200 or more, 250 or more, 300 or more, 350 or more, 400 or more, 450 or more, or 500 or more. In some embodiments, the average hydroxyl number is 700 or less, 650 or less, 600 or less, 550 or less, 500 or less, 450 or less, 400 or less, 350 or less, 300 or less, or 250 or less, and/or is 100 or more, 150 or more, 200 or more, 250 or more, 300 or more, 350 or more, 400 or more, 450 or more, or 500 or more. For example, the average hydroxyl number can be from 100-700, 100-500, 150-450, or 200-400. In some embodiments, the one or more polyols include two or more polyols. For example, there can be a blend of 75% of a polyol having a hydroxyl number of 400 and 25% of a polyol having a hydroxyl number of 100 to produce an average hydroxyl number of 325.

The polyurethane foam can include one or more polyols that can provide a delay in the cream time and tack free time of the polyurethane mixture during foaming. For example, the foam can include polyols containing glycerine and/or amine groups which can delay the cream time and tack free time of the polyurethane mixture. In some embodiments, the one or more polyols can increase the cream time of the polyurethane mixture to 40 seconds or greater such as from 40 seconds to 120 seconds. In some embodiments, the one or more polyols can increase the tack-free time of the polyurethane mixture to 90 seconds or greater such as from 90 seconds to 7 minutes.

The one or more polyols can include amine groups, such as primary amine groups, secondary amine groups, tertiary amine groups, or combinations thereof. In some embodiments, the total amine value (i.e., a measure of the concentration of tertiary, secondary, and primary amine groups as measured in units of mg KOH/g) of 50 or less, 45 or less, 40 or less, 35 or less, 30 or less, 25 or less, 20 or less, 15 or less, 10 or less, or 5 or less. The one or more polyols can have a total amine value (as measured in units of mg KOH/g) of from 0 to 50, from greater than 0 to 50, or from greater than 0 to 45. In some embodiments, the one or more polyols can have a total amine value (as measured in units of mg KOH/g) of about 50.

The functionality of the one or more polyols useful with the foam described herein can be 7 or less, 6.5 or less, 6 or less, 5.5 or less, 5 or less, 4.5 or less, 4 or less, 3.5 or less, 3.25 or less, 3 or less, 2.75 or less, 2.5 or less, or 2.25 or less. In some embodiments, the functionality of the one or more polyols can be 2 or greater, 2.25 or greater, 2.5 or greater, 2.75 or greater, 3 or greater, 3.25 or greater, 3.5 or greater, 3.75 or greater, or 4 or greater. The average functionality of the one or more polyols useful with the foam described herein can be 5.5 or less, for example, 5 or less, 4.5 or less, 4 or less, 3.5 or less, 3.25 or less, 3 or less, 2.75 or less, 2.5 or less, or 2.25 or less. In some embodiments, the average functionality of the one or more first polyols can be 2 or greater, 2.25 or greater, 2.5 or greater, 2.75 or greater, 3 or greater, 3.25 or greater, 3.5 or greater, 3.75 or greater, or 4 or greater. Further, examples of useful first polyols include polyols with an average functionality of from 2.5 to 5.5, from 3 to 5.5, from 3 to 5, from 3 to 4.5, from 2.5 to 4, from 2.5 to 3.5, or from 3 to 4.

The one or more polyols can have an average molecular weight of 250 g/mol or greater (e.g., 300 g/mol or greater, 350 g/mol or greater, 400 g/mol or greater, 450 g/mol or greater, 500 g/mol or greater, 550 g/mol or greater, 600 g/mol or greater, 650 g/mol or greater, 700 g/mol or greater, 750 g/mol or greater, 800 g/mol or greater, 900 g/mol or greater, 1000 g/mol or greater, 1200 g/mol or greater, or 1400 g/mol or greater). In some cases, the one or more polyols have an average molecular weight of 1500 g/mol or less (e.g., 1400 g/mol or less, 1300 g/mol or less, 1200 g/mol or less, 1100 g/mol or less, 1000 g/mol or less, 900 g/mol or less, 800 g/mol or less, 750 g/mol or less, 700 g/mol or less, 650 g/mol or less, 600 g/mol or less, 550 g/mol or less, 500 g/mol or less, 450 g/mol or less, 400 g/mol or less, or 300 g/mol or less). In some cases, the one or more polyols have an average molecular weight of from 250 g/mol to 1500 g/mol, from 250 g/mol to 1000 g/mol, or from 500 g/mol to 1000 g/mol. In some embodiments, the one or more polyols do not include any polyols having a molecular weight of 1000 g/mol or greater. The one or more polyols can include polyester polyols, polyether polyols, or combinations thereof. Suitable polyols include polyether polyols such as those sold under the Carpol® trademark or under the Jeffol® trademark. In some examples, the polyether polyol can include a glycerin-based polyol and derivatives thereof commercially available from Carpenter Co. (e.g., Carpol® GP-240; Carpol® GP-725; Carpol® GP-700; Carpol® GP-1000; Carpol® GP-1500). In some examples, the polyether polyol can include a polypropylene-based polyol and derivatives thereof commercially available from Huntsman International (e.g., Jeffol® FX31-240; Jeffol® G30-650; Jeffol® FX31-167; Jeffol® A-630; Jeffol® AD-310). Suitable polyols include polyester polyols available from Huntsman International (e.g., XO 13001). In some embodiments, the polyols can include a sucrose and/or amine-based polyol. The sucrose and/or amine-based polyol can include, for example, a polyether polyol (including for example ethylene oxide, propylene oxide, butylene oxide, and combinations thereof) which is initiated by a sucrose and/or amine group. Sucrose and/or amine-based polyols are known in the art, and include, for example, sucrose/amine initiated polyether polyol sold under the trade name CARPOL® SPA-357 or CARPOL® SPA-530 (Carpenter Co., Richmond, Va.) and triethanol amine initiated polyether polyol sold under the trade name CARPOL® TEAP-265 (Carpenter Co., Richmond, Va.).

The polyurethane foam can include one or more additional polyols. In some examples, the one or more additional polyols include aromatic polyols such as aromatic polyester polyols, aromatic polyether polyols, or combinations thereof, such as those sold under the TEROL® trademark (e.g., TEROL® 198 and TEROL® 250). The aromatic polyol can have an aromaticity of 35% or greater, such as 38% or greater, 40% or greater, 45% or greater, 50% or greater, or 55% or greater and/or an aromaticity of 80% or less, 75% or less, 70% or less, 65% or less, 60% or less, 55% or less, 50% or less, 45% or less, 50% or less, 45% or less, or 40% or less.

In some embodiments, the one or more additional polyols can include polyols having a large number of primary hydroxyl groups (e.g. 75% or more) based on the total number of hydroxyl groups in the polyol. For example, the high primary hydroxyl group polyols can include 80% or more, 85% or more, 90% or more, 95% or more, or 100% of primary hydroxyl groups.

In some embodiments, the one or more additional polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl) amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the reaction mixture can include one or more additional isocyanate-reactive monomers such as one or more polyamines. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the reaction mixture can include an alkoxylated polyamine (i.e., alkylene oxide-capped polyamines) derived from a polyamine and an alkylene oxide.

Alkoxylated polyamines can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof. Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyols used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyols.

As indicated herein, in the polyurethane foams, one or more isocyanates are reacted with the one or more polyols (and any additional isocyanate-reactive monomers) to produce the polyurethane formulation. In general, with regards to the polyurethane formulation, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. In some embodiments, the foam can include a polyisocyanurate formulation having an isocyanate index from 180 to 380, for example, from 180 to 350, from 200 to 350, or from 200 to 270. As used herein, an isocyanate may be selected to provide a reduced isocyanate index, which can be reduced without compromising the chemical or mechanical properties of the foam.

One or more catalysts can be added to facilitate curing and can be used to control the curing time of the polyurethane matrix. Examples of useful catalysts include amine-containing catalysts (including tertiary amines such as DABCO and tetramethylbutanediamine, and diethanolamine) and tin-, mercury-, and bismuth-containing catalysts. In some embodiments, the catalyst includes a delayed-action tin catalyst. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane. In some embodiments, 0.05 to 0.5 parts catalyst or catalyst system per hundred parts of polyol can be used.

The polyurethane can be present in the foam in amounts from 10% to 50% based on the weight of the foam. For example, the polyurethane can be included in an amount from 14% to 50% or 20% to 50% by weight, based on the weight of the foam. In some embodiments, the polyurethane can be present in an amount of 10% or greater, 15% or greater, 20% or greater, 25% or greater, 30% or greater, 35% or greater, 40% or greater, or 45% or greater by weight, based on the weight of the foam. In some embodiments, the polyurethane can be present in an amount of 50% or less, 45% or less, 40% or less, 35% or less, 30% or less, 25% or less, 20% or less, or 15% or less by weight, based on the weight of foam.

As described herein, the polyurethane foam includes a filler. The filler can be described by its aspect ratio. In some embodiments, the filler in the foam can have an average aspect ratio of length to diameter of from 1:1 to 10,000:1. For example, the filler can have an average aspect ratio of from 1:1 to 9000:1, 1:1 to 8000:1, 1:1 to 7000:1, 1:1 to 6000:1, 1:1 to 5000:1, 1:1 to 4000:1, 1:1 to 3000:1, 1:1 to 2000:1, 1:1 to 1000:1, 1:1 to 700:1, 1:1 to 500:1, 1:1 to 250:1, 1.05:1 to 400:1, 1.1:1 to 300:1, 1.15:1 to 250:1, or 1.2:1 to 200:1. In some embodiments, the filler can have an average aspect ratio of length to diameter of 200:1 or less, 150:1 or less, 100:1 or less, 75:1 or less, 50:1 or less, 40:1 or less, 30:1 or less, 20:1 or less, 10:1 or less, or 5:1 or less, and from 1:1 or more (e.g., 1.05:1 or more, 1.1:1 or more, 1.15:1 or more, or 1.2:1 or more).

The filler can include a particulate filler and particularly an inorganic particulate filler. Suitable examples of particulate fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof.

The particulate filler can have a median particle size diameter of from 0.2 micron to 100 microns. For example, the particulate filler can have a median particle size diameter of 100 microns or less, 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, or 25 microns or less. In some embodiments, the particulate filler can have a median particle size diameter of 0.2 microns or more, 0.3 microns or more, 0.4 microns or more, 0.5 microns or more, 0.7 microns or more, 1 micron or more, 2 microns or more, 5 microns or more, 10 microns or more, 15 microns or more, 20 microns or more, 25 microns or more, 30 microns or more, 35 microns or more, 40 microns or more, or 45 microns or more. In some examples, the particulate filler can have a median particle size diameter of from 0.2 microns to 100 microns, 0.2 microns to 90 microns, or 0.3 microns to 80 microns, 1 to 50 microns, 1 to 25 microns, 2 to 20 microns, or 5 to 15 microns.

In some embodiments, the particulate filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the particulate filler includes fly ash. Fly ash is produced from the combustion of pulverized coal in electrical power generating plants. The fly ash useful with the foam described herein can be Class C fly ash, Class F fly ash, or a mixture thereof. Fly ash produced by coal-fueled power plants is suitable for incorporation in the foam described herein. In some embodiments, the particulate filler consists of or consists essentially of fly ash.

The fly ash can have a particle size distribution with at least two modes. For example, the particle size distribution of the fly ash can be three, four, five, or more modes. Alternatively, the fly ash can be blended with another fly ash to modify the properties of the fly ash to produce a fly ash having a particle size distribution with at least three modes.

In some embodiments, the fly ash can include a first mode having a median particle diameter of 2.0 microns or less. In some examples, the median particle size of the first mode can be 0.3 microns to 1.5 microns, 0.4 microns to 1 microns, or 0.5 microns to 0.8 microns (e.g., 0.7 microns). The fly ash can include a second mode having a median particle diameter of from 3 microns to less than 40 microns. In some examples, the median particle size of the second mode can be from 5 microns to 35 microns, 10 microns to 30 microns, or 10 microns to 25 microns. The fly ash can include a third mode having a median particle diameter of 40 microns or greater. In some examples, the median particle size of the third mode can be from 40 microns to less than 100 microns, for example from 40 microns to 90 microns, 40 microns to 80 microns, or from 40 microns to 75 microns. In some embodiments, the fly ash can include a first mode having a median particle diameter of from 0.3 microns to 1.0 micron, a second mode having a median particle diameter of from 10 microns to 25 microns, and a third mode having a median particle diameter of from 40 microns to 80 microns. In some examples, the fly ash can also include an additional ultrafine mode with a median particle diameter of from 0.05 microns to 0.2 microns.

In some embodiments, the particle size distribution can include 11-35% of the particles by volume in the first mode, 65-89% of the particles by volume in the second mode. In some embodiments, the particle size distribution can include 11-17% of the particles by volume in the first mode, 56-74% of the particles by volume in the second mode, and 12-31% of the particles by volume in the third mode. The ratio of the volume of particles in the second mode to the volume of particles in the first mode can be from 4.5 to 7.5.

The particulate filler can be present in the foam described herein in amounts from 35% to 90% by weight. Examples of the amount of particulate filler present in the foam described herein include 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the particulate filler, for example fly ash, can be present in amounts from 50% to 80% by weight such as from 55% to 80% by weight or from 60% to 75% by weight.

In some embodiments, the particulate filler can include fly ash and calcium carbonate. When used with fly ash, the amount of calcium carbonate in the foam can be from 0.1% to 15% by weight, based on the weight of the foam. In some embodiments, the foam can include 15% or less, 14% or less, 12% or less, 10% or less, or 8% or less by weight calcium carbonate. In some embodiments, the foam can include 0.1% or greater, 0.5% or greater, 1% or greater, 2% or greater, 3% or greater, or 5% or greater by weight calcium carbonate. In some embodiments, when used with fly ash, the foam can include 1% to 15%, 1% to 10%, or 1% to 8% by weight calcium carbonate.

In some embodiments, the particulate filler can include an organic filler, such as a recycled polymeric material. Suitable examples include pulverized polymeric foam or recycled rubber material.

The filler can include a plurality of fibers. The fibers can be any natural or synthetic fiber, based on inorganic or organic materials. Inorganic and organic fibers suitable for use with the foam can include glass fibers, basalt fibers, alumina silica fibers, aluminum oxide fibers, silica fibers, carbon fibers, metal fibers, metal and metal-coated fibers, mineral fibers (such as stone wool, slag wool, or ceramic fiber wool), polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, or combinations thereof. In certain embodiments, the fiber material can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable fibers include synthetic fibers such as, Kevlar, viscose fibers, Dralon® fibers, polyethylene fibers, polyethylene terephthalate fibers, polyethylene naphthalate fibers, polypropylene fibers, polyvinyl alcohol fibers, aramid fibers, or combinations thereof. In some embodiments, the fiber material can include glass fibers. Glass fibers can include fibrous glass such as E-glass, C-glass, S-glass, and AR-glass fibers. In some examples, fire resistant or retardant glass fibers can be included to impart fire resistance or retarding properties to the foam. In some embodiments, the foam can include a combination of fibers that break and fibers that do not break when the foam is being formed using processing machinery and/or fractured by external stress.

In some embodiments, the fibers can be dispersed within the foam. The fibers in the foam can be present in the form of individual fibers, chopped fibers, bundles, strings such as yarns, fabrics, papers, rovings, mats, or tows. In some embodiments, the foam can include a plurality of glass fibers. The average length of the glass fibers in the foam can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the foam can have any dimension of from 1 μm to 30 μm in average diameter. For example, the average diameter of the glass fibers can be 1.5 μm to 30 μm, 3 μm to 20 μm, 4 μm to 18 μm, or 5 μm to 15 μm in average diameter. The glass fibers can be provided in provided in the foam in a random orientation or can be axially oriented.

The fibers can also be described by its aspect ratio. In some embodiments, the fibers in the foam can have an average aspect ratio of length to diameter of from 8:1 to 2000:1. For example, the fibers can have an average aspect ratio of from 8:1 to 1500:1, 8:1 to 1000:1, 8:1 to 700:1, 5:1 to 2000:1, 5:1 to 1500:1, 5:1 to 1000:1, 5:1 to 750:1, 1.5:1 to 500:1, 1.5:1 to 400:1, 1.5:1 to 300:1, 1.5:1 to 250:1, 2:1 to 200:1, 2.5:1 to 150:1, 3:1 to 100:1, 3.5:1 to 75:1, 4:1 to 50:1, 5:1 to 25:1, 5:1 to 20:1, or 5:1 to 10:1. In some embodiments, the fibers can have an average aspect ratio of length to diameter of 1.5:1 or greater, 2:1 or greater, 3:1 or greater, 4:1 or greater, 5:1 or greater, 7.5:1 or greater, 10:1 or greater, 15:1 or greater, 20:1 or greater, 25:1 or greater, 30:1 or greater, or 40:1 or greater. In some embodiments, the fiber can have an average aspect ratio of length to diameter of 200:1 or less, 150:1 or less, 100:1 or less, 75:1 or less, 50:1 or less, 40:1 or less, 30:1 or less, 20:1 or less, 10:1 or less, or 5:1 or less.

The fibers (when used) can be present in the foam in amounts of 15% or less by weight, based on the weight of foam. For example, the fibers can be present in amounts from 0.25% to 15%, 0.5% to 15%, 1% to 15%, 0.25% to 10%, 0.5% to 10%, 1% to 10%, 0.25% to 8%, 0.25% to 6%, or 0.25% to 4% by weight, based on the weight of the foam. In some embodiments, the foam is free of fibers dispersed within the foam.

The foam described herein can comprise additional materials. The additional materials useful with the foam can include foaming agents, blowing agents, chain-extenders, crosslinkers, coupling agents, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. In the case of polyurethane foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the foam in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the foam includes less than 0.5% by weight water. In some embodiments, no chemical foaming agents are used. In some embodiments, water is the only foaming agent used.

Low molecular weight reactants such as chain-extenders and/or crosslinkers can be included in the foam described herein. These reactants help the foam to distribute and contain the fiber material and/or particulate filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some foam, a crosslinker or chain-extender may be used to replace at least a portion of the one or more polyols in the foam. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the foam. Coupling agents may also reduce the viscosity of the foam mixture. Coupling agents can also allow higher filler loadings of the particulate filler such as fly ash, and/or fiber material, and may be used in small quantities. For example, the foam may comprise about 0.01 wt % to about 0.5 wt % of a coupling agent. Examples of coupling agents useful with the foam described herein include Ken-React LICA 38 and KEN-React KR 55 (Kenrich Petrochemicals; Bayonne, N.J.). Examples of dispersing agents useful with the foam described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the foam described herein. Examples of UV light stabilizers include hindered amine type stabilizers and opaque pigments like carbon black powder. Fire retardants can be included to increase the flame or fire resistance of the foam. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the foam described herein. An example of a pigment is iron oxide, which can be added in amounts ranging from about 2 wt % to about 7 wt %, based on the total weight of the foam.

As described herein, the polyurethane foam can comprise a high filler loading, such as from 50% to 90% by weight of the foam, which can result in an increase in the density of the foam. In some embodiments, it is desirable that the foam has a density below a particular threshold at the desired loadings so it remains relatively lightweight and/or can be effectively processed. In some embodiments, the amount of fibers and/or particulate filler can be present in the composite mixture in amounts to produce a foam having a density 5 $lb/ft^3$ to 70 $lb/ft^3$. In some embodiments, the density is at least 10 $lb/ft^3$ and/or 35 $lb/ft^3$ or less. For example, the density of the foam can be 10 $lb/ft^3$ to 35 $lb/ft^3$, 15 $lb/ft^3$ to 35 $lb/ft^3$, 15 $lb/ft^3$ to 25 $lb/ft^3$, 10 $lb/ft^3$ to 30 $lb/ft^3$, 10 $lb/ft^3$ to 25 $lb/ft^3$, or 20 $lb/ft^3$ to 30 $lb/ft^3$.

Incorporation of the fibers and/or particulate filler in a high filler loading can increase the flexural strength of the foam, compared to a foam without the fibers and/or high particulate filler. It is desirable to provide polyurethane foams that are relatively lightweight and strong enough to be used in various applications such as by itself as a structural material or in place of composite boards or the like. In some embodiments, the flexural strength of the polyurethane foam can be increased by at least 10%, for example, 15% or greater, 20% or greater, 25% or greater, 30% or greater, 35% or greater, 50% or greater, 75% or greater, or even 100% or greater, compared to a foam without fibers and/or high particulate filler loading. The flexural strength of the foam described herein can be 100 psi or greater. For example, the flexural strength of the foam can be 200 psi or greater, 300 psi or greater, 400 psi or greater, 500 psi or greater, 600 psi or greater, 700 psi or greater. In some embodiments, the flexural strength of the foam can be from 100 to 700 psi. The flexural strength can be determined by the load required to fracture a rectangular prism loaded in the three point bend test as described in ASTM C1185-08 (2012).

The foam can exhibit a ratio of flexural strength (in psi) to density (in $lb/ft^3$) of from 10:1 to 200:1. In some embodiments, the foam can exhibit a ratio of flexural strength (in psi) to density (in $lb/ft^3$) of from 10:1 to 100:1 or from 20:1 to 100:1.

The modulus of elasticity (stiffness) of the foam can be 10 ksi or greater, 15 ksi or greater, 20 ksi or greater, 25 ksi or greater, or 30 ksi or greater. For example, the modulus of elasticity can be from 15 to 30 ksi, from 20 to 30 ksi, or from 22 to 28 ksi. The modulus of elasticity can be determined as described in ASTM C947-03.

The foam can exhibit a ratio of modulus of elasticity (in ksi) to density (in $lb/ft^3$) of from 1:2 to 2:1. In some embodiments, the foam can exhibit a ratio of modulus of elasticity (in ksi) to density (in $lb/ft^3$) of 1:1.5 to 1.5:1 or from 1:1.2 to 1.2:1.

The compressive strength of the foam can be 100 psi or greater. For example, the compressive strength can be from 100 to 300 psi, from 150 to 250 psi or from 175 to 240 psi. The compressive strength can be determined as described in ASTM D1621. The foam can exhibit a ratio of compressive strength (in psi) to density (in $lb/ft^3$) of from 7:1 to 25:1. In some embodiments, the foam can exhibit a ratio of compressive strength (in psi) to density (in $lb/ft^3$) of from 8:1 to 15:1.

The foam can have a thickness of from 0.1 inch to 6 inches. For example, the foam can have a thickness of 0.1 inch to 4 inches, 0.1 inch to 3 inches, 0.1 inch to 2 inches, or 0.125 inch to 1 inch.

Reinforced Polyurethane Foams

Composite panels comprising the polyurethane foam are described herein. In some embodiments, the composite panel can include a first fiber reinforcement; a polyurethane foam having a first surface and a second surface opposite the first surface, wherein the first surface is in contact with the first fiber reinforcement; and a cementitious material adjacent the first fiber reinforcement opposite the foam.

The fiber reinforcement can include any of the fiber materials as described herein and can include a blend of different fibers (either type or size). In some embodiments, the fiber reinforcement can include glass fibers. In some embodiments, the fibrous glass is a low alkalinity fiber such as an E-glass fiber. The fiber reinforcement can be woven or non-woven. In some embodiments, the fiber reinforcement can be present in the form of individual fibers, chopped fibers, bundles, strings such as yarns, fabrics, scrims, papers, rovings, mats, or tows.

The fibers in the reinforcement can have an average diameter of 100 microns or less. For example, the fibers in the fiber reinforcement can have an average diameter of 1 µm or greater, 2 µm or greater, 3 µm or greater, 4 µm or greater, 5 µm or greater, 10 µm or greater, 15 µm or greater, 20 µm or greater, 25 µm or greater, 30 µm or greater, 40 µm or greater, 50 µm or greater, 60 µm or greater, 70 µm or greater, 80 µm or greater, 90 µm or greater, or 100 µm or greater. In some embodiments, the fibers in the fiber reinforcement can have an average diameter of 90 µm or less, 80 µm or less, 70 µm or less, 60 µm or less, 50 µm or less, 40 µm or less, 30 µm or less, 25 µm or less, or 20 µm or less. In certain embodiments, the fibers in the fiber reinforcement can have an average diameter of from 1 µm to 100 µm, 1 µm to 70 µm, 1 µm to 50 µm, 1 µm to 25 µm, 5 µm to 100 µm, 5 µm to 50 µm, 5 µm to 25 µm, or 5 µm to 20 µm.

The thickness of the fiber reinforcement on the foam can be any suitable thickness to reinforce the foam. In some embodiments, the average thickness of the fiber reinforcement can be 0.1 inch or less. For example, the fiber reinforcement can have an average thickness of 0.07 inch or less, 0.05 inch or less, 0.03 inch or less, 0.01 inch or less, 0.005 inch or less, or 0.001 inch or less. In some embodiments, the fiber reinforcement can have an average thickness of 0.001 inch or greater, 0.005 inch or greater, 0.01 inch or greater, 0.03 inch or greater, 0.05 inch or greater, or 0.07 inch or greater. In some embodiments, the fiber reinforcement can have an average thickness of from 0.001 inch to 0.1 inch or from 0.001 inch to 0.05 inch.

The fiber reinforcement can have a basis weight of 50 $g/ft^2$ or less. In some embodiments, the fiber reinforcement can have a basis weight of 40 $g/ft^2$ or less, 30 $g/ft^2$ or less, 20 $g/ft^2$ or less, 17 $g/ft^2$ or less, 15 $g/ft^2$ or less, 12 $g/ft^2$ or less, 10 g/ft² or less, 9 g/ft² or less, 8 g/ft² or less, 7 g/ft² or less, 6 g/ft² or less, or 5 g/ft² or less. In some embodiments, the fiber reinforcement can have a basis weight of 0.5 g/ft² or greater, 1 g/ft² or greater, 2 g/ft² or greater, 3 g/ft² or greater, 4 g/ft² or greater, 5 g/ft² or greater, 7 g/ft² or greater, 10 g/ft² or greater, 15 g/ft² or greater, or 20 g/ft² or greater. In some embodiments, the fiber reinforcement can have a basis weight of from 0.5 g/ft² to 50 g/ft², from 0.5 g/ft² to 25 g/ft², from 0.5 g/ft² to 20 g/ft², from 1 g/ft² to 10 g/ft², or from 1.5 g/ft² to 10 g/ft².

As described herein, the composite panel can include a cementitious material. In some embodiments, the cementitious material can form a layer adjacent the first fiber reinforcement, opposite the foam. The cementitious material can include any suitable material for forming a cementitious layer with the desirable properties. In some embodiments, the cementitious material includes a rapid set cement. The rapid set cement can include calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, or combinations thereof. In some embodiments, the cementitious material can include Portland cement. The rapid set cement and/or the Portland cement can be present in an amount of 50% or greater by weight, e.g., 60% or greater, 70% or greater, 80% or greater, or 90% or greater by weight, based on the total weight of the cementitious material. In some embodiments, the cementitious material does not include gypsum (calcium sulfate hydrate).

In some embodiments, the cementitious material can include an inorganic polymer formed by reacting a reactive powder and an activator in the presence of water. Suitable inorganic polymers are described in U.S. Patent Publication No. 2014/0349104, which is herein incorporated by reference. In some embodiments, the reactive powder for use in the cementitious material includes fly ash. In some examples, the majority of the fly ash present is Class C fly ash (i.e., greater than 50% of the fly ash present is Class C fly ash).

The fly ash is the principal component of the reactive powder and can be present in an amount of greater than 50% by weight, 65% by weight or greater, 75% by weight or greater, or 85% by weight or greater of the reactive powder. In some examples, the fly ash is present in an amount of 90% by weight or greater of the reactive powder or 95% by weight or greater of the reactive powder. For example, the fly ash can be present in an amount of 85% by weight or greater, 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater based on the weight of the reactive powder. In some embodiments, the reactive powder consists of or consists essentially of fly ash.

The reactive powder for use as a reactant to form the inorganic polymer compositions can further include other cementitious components. In some embodiments, the reactive powder can include a rapid set cement as described herein. In some embodiments, the reactive powder can include Portland cement. In some embodiments, the reactive powder further includes slag. In some embodiments, the reactive powder further includes sand. In some embodiments, the reactive powder includes Portland cement, calcium aluminate cement, calcium sulfoaluminate cement, and/or slag. In these examples, the reactive powder can include 10% or less by weight of the other cementitious material. In some examples, the reactive powder includes 5% by weight or less, 3% by weight or less, or 1% by weight or less of other cementitious material. For example, the reactive powder can include the other cementitious material cement in an amount of 10% or less by weight, 9% or less by weight, 8% or less by weight, 7% or less by weight, 6% or less by weight, 5% or less by weight, 4% or less by weight, 3% or less by weight, 2% or less by weight, 1% or less by weight, or 0.5% or less by weight. In some examples, the reactive powder is substantially free from other cementitious material. For example, the reactive powder can include less than 0.1% by weight, less than 0.01% by weight, or less than 0.001% by weight of Portland cement based on the weight of the reactive powder. In some embodiments, the reactive powder includes no Portland cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75%, or 35-65% citrate salts by weight. The mixture in solution and the mixture when combined with the reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, 0.75 to 7.5, or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The inorganic polymer compositions described herein are prepared in the presence of aerating agents, including blowing agents and foaming agents. Examples of suitable blowing agents include aluminum powder, perborates (e.g., sodium perborate), peroxides (e.g., $H_2O_2$ or an organic peroxide), and chloride dioxide. The blowing agent can be present in an amount of from 0.1% to 10% by weight of the reactive powder. The aerating agents described herein can also include foaming agents. In some examples, the foaming agent can be an air-entraining agent. Foaming agents can be used to help the system maintain air or other gases, e.g., from the mixing process. The foaming agents can include non-ionic surfactants, anion surfactants, and/or cationic surfactants. Examples of suitable foaming agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. The foaming agents can be provided in an amount of 0.1% or less based on the weight of the reactive powder. In some examples, the foaming agents can be included in the compositions in an amount of from 0.001% by weight to 0.1% by weight or from 0.005% by weight to 0.05% by weight (e.g., 0.01% by weight).

The reactants to form the inorganic polymer compositions are reacted in the presence of water. The water can be provided in the reactive mixture by providing the activator in solution and/or by adding water directly to the reactive mixture. The solution to binder or solution to reactive powder weight ratio (i.e., the ratio of the solution including activator to reactive powder) can be from 0.09:1 to 0.5:1, depending on the product being made and the process being used for producing the product.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. In some examples, the retardant is present in an amount of from 0.4% to 7.5% based on the weight of the reactive powder.

The cementitious material can include a filler, such as those described herein. In some examples, the cementitious material can include a rapid set cement, Portland cement, and a filler such as fly ash, slag, sand, or combinations thereof. In some embodiments, the cementitious material can include a rapid set cement and a filler such as fly ash, slag, or sand. In some examples, the cementitious material can include Portland cement and a filler. In some examples, the cementitious material consists or consists essentially of a rapid set cement, a filler in an amount of 30% or less by weight (e.g., 25% or less by weight, or 20% or less by weight), based on the total weight of the cementitious material, and optionally Portland cement. In some examples, the filler (e.g., fly ash, slag, sand, or combinations thereof) can be present in an amount of from 5% to 30% by weight, based on the total weight of the cementitious material. In some examples, the filler can include a lightweight filler.

In some embodiments, a cementitious material can include a fiber material, e.g., to provide increased strength, stiffness or toughness. In some examples, fire resistant or retardant glass fibers can be included to impart fire resistance or retarding properties to the cementitious material. Suitable fiber materials useful with the cementitious material are described herein. The fibers can be included in an amount of 0.1% to 6% based on the weight of the cementitious material.

Additional components useful with the cementitious material described herein include air entraining agents, water reducers, plasticizers, pigments, anti-efflorescence agents, ultraviolet light stabilizers, retardants including fire retardants, antimicrobials, and antioxidants. Air entraining agents can be used to entrain air in the cementitious material thereby reducing the density of the cementitious material. Water reducers can be included in the compositions described herein to reduce the amount of water in the composition while maintaining the workability, fluidity, and/or plasticity of the composition. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of the cementitious material.

The cementitious material can further include a photocatalyst. Photocatalysts are optionally included for the reduction of nitrogen oxides (NOx) and self-cleaning. In some embodiments, the cementitious material can include titanium dioxide. Example of suitable photocatalyst includes titanium dioxide. In some embodiments, the photocatalyst can be dispersed within the cementitious material. In some embodiments, the photocatalyst can be present as a coating on the cementitious material. In some examples, the titanium dioxide can be provided as a coating on the cementitious material and is present in an amount of from 1% to 10% based on the weight of the coating on the cementitious material.

The cementitious material can be any suitable thickness to confer a desirable property to the composite panel, e.g., to provide increased strength, handleability, stiffness or toughness. In some embodiments, the thickness of the cementitious material can be 0.5 inch or less. For example, the cementitious material can have an average thickness of 0.4 inch or less, 0.3 inch or less, 0.25 inch or less, 0.20 inch or less, or 0.15 inch or less. In some embodiments, the cementitious material can have an average thickness of 0.005 inch or greater, 0.01 inch or greater, 0.05 inch or greater, or 0.1 inch or greater. In some embodiments, the cementitious layer can have an average thickness of from 0.005 inch to 0.25 inch or from 0.005 inch to 0.20 inch.

In some embodiments, the fiber material (including the fiber reinforcement), the cementitious material, and/or the particulate filler such as fly ash can be coated with a composition to modify their reactivity. For example, the fiber material, the cementitious material, and/or the particulate filler can be coated with a sizing agent such as a coupling agent (compatibilizer). In some embodiments, the fiber material, the cementitious material, and/or the particulate filler can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al. and U.S. Pat. No. 6,602,379 to Li et al. describe suitable aminosilane compounds for coating fibers. In some embodiments, the fiber material, the cementitious material, and/or the particulate filler are surface coated with a composition comprising a silane compound such as aminosilane. In some embodiments, the fiber material, the cementitious material, and/or the particulate filler are surface coated with a composition comprising an oil, starch, or a combination thereof.

As described herein, the composite panel can include a first fiber reinforcement on a first surface of the foam and a second fiber reinforcement on a second surface, opposite the first surface, of the foam. In some embodiments, the composite panel can include a first fiber reinforcement on a first surface of the foam and a material, other than a fiber reinforcement, on a second surface of the foam. In some embodiments, the material can include a cementitious layer, a paper sheet, a metal sheet, a polymeric layer, or a combination thereof. Suitable materials that can be included on the second surface of the foam include an aluminum sheet, an aluminum-plated sheet, a zinc sheet, a zinc-plated sheet, an aluminum/zinc alloy sheet, an aluminum/zinc alloy-plated sheet, a stainless steel sheet, craft paper, a polymeric surfacing film, or a combination thereof.

Methods

Methods of preparing the polyurethane foams are described herein. The polyurethane foam can be produced using a batch, semi-batch, or continuous process. In some embodiments, the method can include forming a polyurethane mixture. The polyurethane mixture can be produced by mixing the one or more isocyanates, the one or more polyols, and the filler in a mixing apparatus. The materials can be added in any suitable order. For example, in some embodiments, the mixing stage of the method used to prepare the foam can include: (1) mixing the polyol and filler; (2) mixing the isocyanate with the polyol, and filler; and optionally (3) mixing the catalyst with the isocyanate, the polyol, and the filler.

The polyurethane mixture can be blended in any suitable manner to obtain a homogeneous or heterogeneous blend of the one or more isocyanate, the one or more polyols, the filler, and catalyst. In some embodiments, mixing can be conducted in a high speed mixer or an extruder. The method can include applying shear to the mixture to disperse the filler in the mixture. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite panels described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The method of making the foam can include allowing the one or more isocyanates and the one or more polyols to react in the presence of the filler. The curing stage of the method used to prepare the foam can be carried out in a mold cavity of a mold, the mold cavity formed by at least an interior mold surface. In some embodiments, a molded article can then be formed prior to the additional method steps in forming the composite panel.

In some embodiments, the one or more polyols, one or more isocyanates, or a mixture thereof, and the filler can be included in amounts, which results in a decrease in the viscosity of the polyurethane mixture, and thus improves the processability of such materials and products.

In some embodiments, it is desirable that the polyurethane mixture has a viscosity below a particular threshold at the desired loadings so it can be effectively processed. In some embodiments, the amount of one or more polyols, one or more isocyanates, or a mixture thereof, and the filler can be present in the mixture in amounts to produce a workable viscosity (initial viscosity) of from 100,000 cPs or less. In some embodiments, the mixture can be applied to the mold at a viscosity of from 5,000 to 100,000 cPs or from 20,000 to 100,000 cPs at the temperature of the mixture. The viscosity of the composite mixture can be measured using a Brookfield Viscometer.

In some embodiments, the polyurethane mixture can be foamed. The method of making the polyurethane foams can include allowing the mixture to expand via a gas phase to form a foam having a first surface and a second surface opposite the first surface. The gas phase can be generated in situ from reaction of water with the one or more isocyanates. The gas can be introduced into the polyurethane mixture. Suitable gases are known in the art. In some embodiments, the gas can be captured after gelation (i.e., formation) of the foam.

The foaming action of the polyurethane foams can be described as having a "cream time," during which foaming is initiated and the mixture reaches a consistency of a soft creamy foam, a "firm time" at which the foam sets up and hardens, and a "tack free time" at which time surface no longer feels sticky. The cream time of the polyurethane can be 20 seconds or longer, 40 seconds or longer, 60 seconds or longer, or 80 seconds or longer. For example, the cream time of the polyurethane can be from 20 seconds to 120 seconds, from 40 seconds to 120 seconds, from 60 seconds to 120 seconds or from 80 seconds to 120 seconds. The tack free time of the polyurethane can be 90 seconds or longer, 2 minutes or longer, 3 minutes or longer, 4 minutes or longer, or 5 minutes or longer and/or 7 minutes or less, 6 minutes or less, 5 minutes or less, or 4 minutes or less. For example, the tack free time of the polyurethane can be from 90 seconds to 7 minutes, from 2 minutes to 7 minutes or from 3 minutes to 6 minutes. In some embodiments, the polyurethane foam does not reach a hardness of 20 shore D in less than 5 minutes. For example, the polyurethane foam does not reach a hardness of 20 shore D in less than 7.5 minutes, less than 10 minutes, less than 12.5 minutes, less than 15 minutes, less than 17.5 minutes, or less than 20 minutes. The Shore D hardness can be determined using a durometer as described in ASTM D2240.

In some cases, the mixture can be allowed to rise freely during foaming in the mold. In some cases, the mixture can be placed under the pressure of a mold cavity prior to or during the foaming of the polyurethane foam. After the polyurethane foam is formed, the method can include removing the foam from the mold.

Methods of making composite panels from the polyurethane foams are also described herein. The method can include applying a first fiber reinforcement to a surface of the foam. In some embodiments, the fiber reinforcement can be applied to the foam before it has completely cured, such that at least a portion of the fiber reinforcement becomes embedded in the foam. For example, the fiber reinforcement can be applied to the polyurethane mixture after the mixture is fed to the mold. In some embodiments, the fiber reinforcement can be applied to the mold prior to the mixture being fed into the mold and can become embedded prior to the full curing of the mixture. In some embodiments, the fiber reinforcement can be applied to the foam after the polyurethane has been cured. For example, an adhesive can be applied to bond the fiber reinforcement to the foam. The adhesive can be applied by spray coating, curtain coating, brushing, roller coating, dip coating, spin coating, or flow coating. Suitable adhesives include an adhesive derived from ethylene vinyl acetate, acrylic, urethane, epoxy, starch, gum, resin (such as gum arabic, gum tragacanth, rubber or shellac), or combinations thereof.

The method can further include applying a cementitious material to the fiber reinforcement. The cementitious material can be in the form of a cementitious slurry. The cementitious slurry can be applied by roller coating, curtain coating, dip coating, brushing, with a trowel, or spraying. In some embodiments, the application of the cementitious material can be vacuum assisted. In some embodiments, the method can include applying the cementitious slurry to the fiber reinforcement, after applying the fiber reinforcement to the foam. In some embodiments, the cementitious material and the fiber reinforcement can be applied to the foam simultaneously. For example, the method can include applying a cementitious slurry to the fiber reinforcement prior to applying the fiber reinforcement to the foam. In this example, at least a portion of the fiber reinforcement becomes embedded in the cementitious material.

In some embodiments, the method can include applying the cementitious slurry to the foam, prior to applying the fiber reinforcement to the foam.

The method of making the composite panels can include applying an adhesive to the fiber reinforcement or the foam prior to applying the cementitious material to facilitate bonding of the cementitious material. The adhesive can be applied by spray coating, curtain coating, brushing, roller coating, dip coating, spin coating, or flow coating. Suitable adhesives are described herein.

In some embodiments, the method can include applying a water and/or water vapor barrier prior to applying the cementitious material. For example, the adhesive can produce a water and/or water vapor barrier. Alternatively, a water and/or water vapor barrier film or other material can be applied prior to applying the cementitious material.

In some embodiments, the cementitious material, the first fiber reinforcement, and the foam are directly adhered without the use of an adhesive layer. In embodiments wherein the cementitious slurry and the first fiber reinforcement are directly bonded to a fly ash-filled foam, it has been discovered that the cementitious slurry forms mechanical bonds with the fly ash present in the foam thereby enhancing the bonding of the cementitious slurry and the first fiber reinforcement to the foam.

In some embodiments, the method can include applying a liquid to a surface of the foam to activate the cementitious slurry. In certain embodiments, the liquid can be an aqueous solution having a pH of 5 or greater or 6.5 or greater. The liquid optionally includes an activator. Suitable activators are described herein.

In some embodiments, incorporation of the fiber reinforcement and/or the cementitious layer onto the filled foam can maintain similar or improved physical properties and mechanical performance such as flexural strength, hardness, stiffness, flame resistance, and handleability of such materials, when the fiber reinforcement and/or the cementitious layer is excluded from or included in minor amounts in the foam. The optimization of various properties of the composite panels, such as hardness, stiffness, flexural strength, handleability, and flame resistance of the foams allows their use in building materials and other structural applications. For example, the composite panels can be formed into shaped articles and used in building materials. Suitable building materials include building panels, tile backer board, sheathing, roofing products, siding materials, sheets, sound barrier/insulation, thermal barriers, insulation, decking materials, fencing materials, cladding, or other shaped articles. Examples of shaped articles made using the composite panels described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, wall boards, ceiling tiles, ceiling boards, soffits, or railroad ties.

In some embodiments, incorporation of the fiber reinforcement on the filled foam to form the composite panels can increase the flexural strength of the foam, compared to a foam without the fiber reinforcement. In some embodiments, the flexural strength of the foam can be increased by at least 10%, for example, 15% or greater, 20% or greater, 25% or greater, 30% or greater, 35% or greater, 50% or greater, 75% or greater, or even 100% or greater, compared to a foam without the fiber reinforcement. The flexural strength of the composite panels described herein can be 200 psi or greater (e.g., up to 1600 psi). For example, the flexural strength of the composite panels can be 300 psi or greater, 500 psi or greater, 700 psi or greater, 900 psi or greater, 1000 psi or greater, 1100 psi or greater, 1200 psi or greater, 1300 psi or greater, 1400 psi or greater, or 1500 psi or greater. The flexural strength can be determined by the load required to fracture a rectangular prism loaded in the three point bend test as described in ASTM C1185-08 (2012).

In some embodiments, incorporation of the fiber reinforcement and the cementitious layer on the filled polyurethane foam can increase the hardness of the foam, compared to a composite without the fiber reinforcement and the cementitious layer. In some embodiments, the Shore D hardness of the composite panels described herein can be 50 or greater (e.g., up to 90). For example, the Shore D hardness of the composite panels can be 55 or greater, 60 or greater, 65 or greater, 75 or greater, or 80 or greater. The Shore D hardness can be determined using a durometer as described in ASTM D2240.

In some embodiments, incorporation of the fiber reinforcement and the cementitious layer on the foam can increase the stiffness of the composite, compared to a composite without the fiber reinforcement and the cementitious layer. In some embodiments, the modulus of elasticity (stiffness) of the composite panel can be 10 ksi or greater, 50 ksi or greater or 100 ksi or greater. For example, the modulus of elasticity can be from 10 to 500 ksi or from 50 to 500 ksi. The modulus of elasticity can be determined as described in ASTM C947-03.

In some embodiments, incorporation of the fiber reinforcement and the cementitious layer on the filled foam can increase the flame resistance of the composite, compared to a composite without the fiber reinforcement and the cementitious layer. In some embodiments, the composite panels can be qualified as a Class A material in the ASTM E84 tunnel test. In some embodiments, the composite panels have a flame spread rating of 25 or less and a smoke development rating of 450 or less. The flame spread and smoke development ratings can be determined as described in the ASTM E84 test.

EXAMPLES

Preparation of Polyurethane Foams:

Polyurethane foams 1-3 were prepared using the components detailed in Table 1 below. The polyol was a polyester based polyol having a hydroxyl number of 374 mg KOH/g, a functionality of 2.7, and a viscosity of 2615 mPa·s.

The foams were prepared by mixing the polyol with a catalyst, water, and when present, a silicone surfactant in a vortex to form a polyol mixture. Fly ash (when present) and methylene diphenyl diisocyanate was then mixed with the polyol mixture. The resulting mixture was extruded into a mold and allowed to cure. The height of the foams were measured continuously using a Messtechnik Foamat® Qualification System apparatus (Format Messtechnik GmbH, Germany).

TABLE 1

Components used to form polyurethane foams 1-3.

| Formulation | Polyol | Catalyst (.02%) | Water (1 pphp) | Surfactant | Filler | Isocyanate (Index 98) |
|---|---|---|---|---|---|---|
| Foam #1 | 29.57 g | 0.591 g | 0.3 g | | | 30.13 g |
| Foam #2 | 29.43 g | 0.586 g | 0.29 g | 0.29 g | | 29.98 g |
| Foam #3 | 19.72 g | 0.394 g | 0.2 g | | 60 g | 20.08 g |

TABLE 2

Mechanical properties of filled polyurethane foamed using a surfactant.

| | Density (pcf) | Modulus (ksi) | Flexural Strength (psi) | Extension (in.) | Handleability |
|---|---|---|---|---|---|
| Average | 13.81 | 13.77 | 229 | 0.455 | 5.97 |
| Std. Dev. | 0.2 | 1.7 | 14 | 0.048 | 0.25 |

Figure 2:
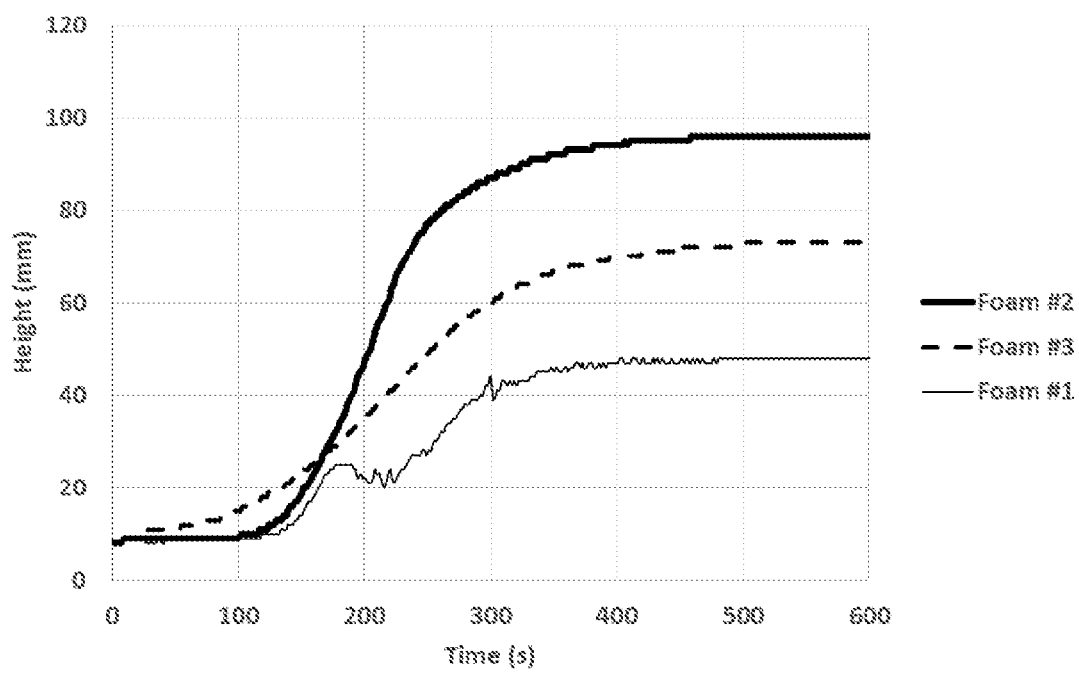
FIG. 2 is a graph showing the change in height over time for polyurethane foams formed with and without surfactant.

Summary: As shown in FIGS. 1 and 2, foam #1 (without surfactant and fly ash collapsed) whereas foams #2 (including a surfactant but no filler) and #3 (including a filler but no surfactant) rose and stabilized at large height.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A filled polyurethane foam, comprising:
   a polyurethane formed by (a) a reaction mixture comprising (i) one or more isocyanates selected from the group consisting of diisocyanates, polyisocyanates, and mixtures thereof, and (ii) one or more polyols; and (b) from greater than 50% to 90% by weight, based on a total weight of the polyurethane composite, of a filler;
   wherein the filled polyurethane foam is made without adding a surfactant to the reaction mixture;
   wherein the filled polyurethane foam has a density of at least 5 lb/ft$^3$ and a flexural strength from 100 psi to 700 psi; and
   wherein the filler is a particulate filler having multimodal particle size distribution, the particle side distribution including a first mode with a median particle diameter of 2.0 microns or less and a second mode with a second median particle diameter of 3 microns to less than 40 microns.

2. The filled polyurethane foam of claim 1, wherein the filled polyurethane foam further includes a plurality of fibers.

3. The filled polyurethane foam of claim 2, wherein the plurality of fibers is present in an amount of from 0.25% to 10% by weight, based on the total weight of the filled polyurethane foam.

4. The filled polyurethane foam of claim 2, wherein the plurality of fibers includes a plurality of glass fibers, polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof.

5. The filled polyurethane foam of claim 2, wherein the plurality of fibers have an average aspect ratio of length to diameter of 8:1 to 700:1.

6. The filled polyurethane foam of claim 1, wherein the particulate filler comprises fly ash.

7. The filled polyurethane foam of claim 1, having a density of from 15 lb/ft$^3$ to 35 lb/ft$^3$.

8. A method of making a filled polyurethane foam, comprising:
   mixing one or more isocyanates selected from the group consisting of diisocyanates, polyisocyanates, and mixtures thereof, one or more polyols; and a particulate filler to produce a mixture, wherein the particulate filler is present in an amount from greater than 50% to 90% by weight, based on a total weight of the mixture, and wherein the mixture does not include a surfactant;

applying the mixture to a mold; and allowing the mixture to react and expand to form the filled polyurethane foam, wherein the resulting filled polyurethane foam has a density of at least 5 lb/ft$^3$, wherein the filled polyurethane foam has a flexural strength from 100 psi to 700 psi, and wherein the particulate filler has a multimodal particle size distribution having at least two modes including a first mode with a first median particle diameter and a second mode with a second median particle diameter different than the first median particle diameter.

9. The method of claim 8, wherein the mixture further includes a plurality of fibers.

10. The method of claim 9, wherein the plurality of fibers is present in an amount of from 0.25% to 10% by weight, based on the total weight of the mixture.

11. The method of claim 9, wherein the plurality of fibers have an average aspect ratio of length to diameter of 8:1 to 700:1.

12. The method of claim 9, wherein the plurality of fibers includes a plurality of glass fibers, polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof.

13. The method of claim 8, wherein the first median particle diameter or the second median particle diameter of the particulate filler is less than 50 microns.

14. The method of claim 8, wherein the first median particle diameter or the second median particle diameter of the particulate filler is less than 25 microns.

15. The method of claim 8, wherein the particulate filler comprises fly ash.

* * * * *